Jan. 1, 1924. 1,479,409
K. A. EDSTROM
BINOCULAR
Filed April 8, 1920

INVENTOR.
K. A. EDSTROM.
BY
ATTORNEY.

Patented Jan. 1, 1924.

1,479,409

UNITED STATES PATENT OFFICE.

KARL A. EDSTROM, OF DENVER, COLORADO.

BINOCULAR.

Application filed April 8, 1920. Serial No. 372,239.

*To all whom it may concern:*

Be it known that I, KARL A. EDSTROM, a citizen of the United States, residing at Denver, in the county of Denver and State of Colorado, have invented certain new and useful Improvements in Binoculars, of which the following is a specification.

This invention relates to binoculars and more particularly to the focal and interpupillary adjustments therefor.

It is the object of the present invention to provide an easily operated mechanism of simple and effective construction for moving the eye pieces of a binocular telescope relative to the respective objective casings to obtain different focal adjustments.

Another object of the invention is to provide a simple dust-tight means for mounting the eye pieces upon the objective casings, which permits of the eye pieces being separately moved for secondary focal adjustments without strain upon the arms by which they are pivotally connected.

With these and other objects in view all of which will be fully disclosed in the course of the following description, my invention consists of the constructions and arrangements of parts shown in the accompanying drawings in the several views of which corresponding parts are similarly designated and in which—

Figure 1:
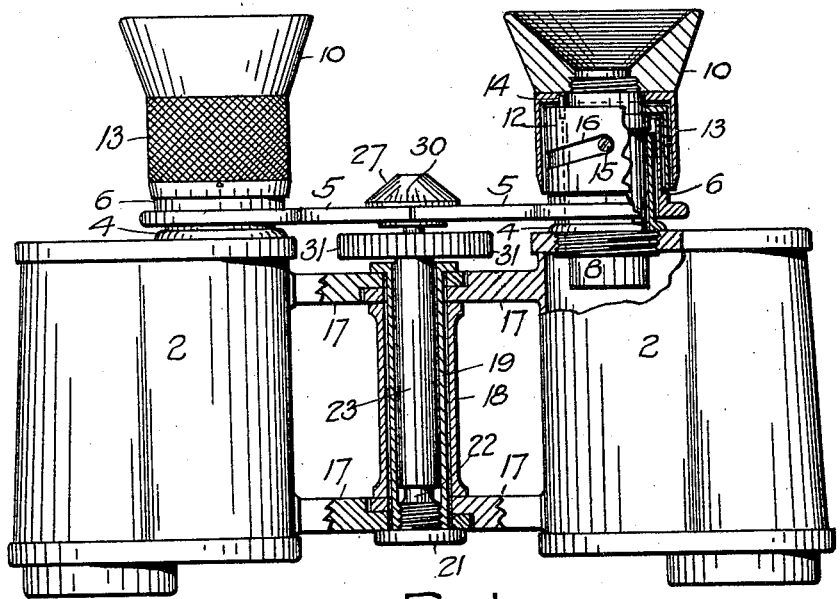
Figures 2, 3:
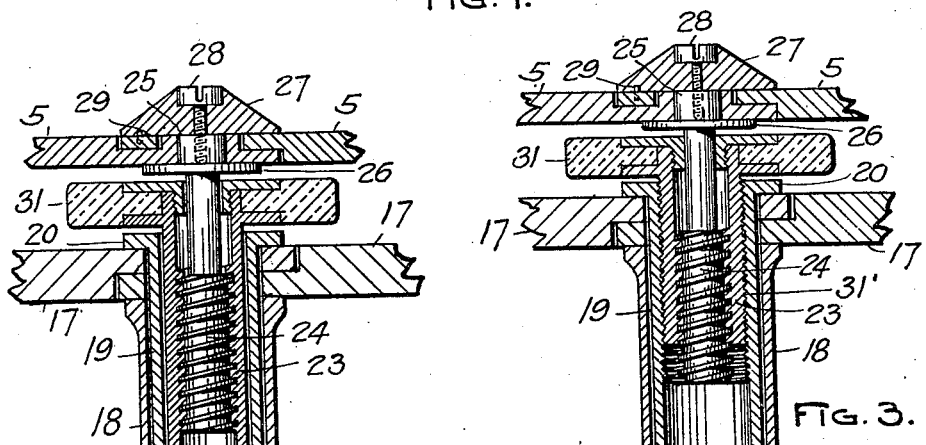
Figure 4:
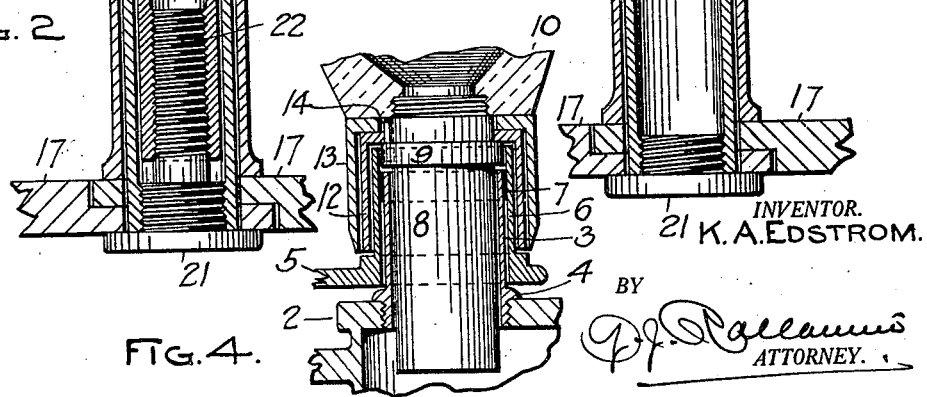

Figure 1 is a sectional elevation of a binocular telescope constructed in accordance with the present invention;

Figure 2, an enlarged longitudinal section through the focal adjustment of the same;

Figure 3, a similar section showing a modified construction of the adjusting mechanism, and Figure 4, an enlarged section through one of the eye-pieces of the binocular showing in detail the means by which they are mounted for separate adjustment with relation to the respective objective casings.

Referring more specifically to the drawings the reference numerals 2 designate the two objective casings of a binocular telescope, which as usual have a hinged connection for their relative adjustment to permit of varying the pupillary distance between their lenses.

The hinged connection of the casings embodies mechanism for the focal adjustment of the eye pieces which are mounted for independent secondary adjustment at the ends of the casings in the following manner.

A hollow stem or barrel 3 upon which the moving parts of the eye piece are supported is screwed into an opening in the end of the casing and extends exteriorly thereof, the position of the stem being definitely established by the engagement of a circumferential flange 4 with the outer surface of the casing.

A hinged connection between the two eye-pieces is obtained by a pair of arms 5 the free ends of which are pivotally connected in alinement with the pivotal axis of the objective casings and which at their opposite ends are provided with sleeves 6 rotatably fitted upon the barrels 3.

Gaskets 7 of velvet or other suitable fabric are interposed between the barrels and the respective sleeves to exclude dirt and absorb lateral play.

The eye-piece proper consists of a tubular lens-holder 8 provided with a circumferential collar 9 and having an external screw-thread at its outer end for the connection of the eye-cap 10. The lens-holder which extends through the barrel on the objective casing carries a concentric slide ring 12 and exteriorly thereof a thumb-shell 13, the ring being slidably fitted around the sleeve 6 of the respective hinge arm, to cooperate therewith for focal adjustment of the eye-piece.

The ring and the shell have at their upper ends inwardly extending flanges by which they are secured between the collar on the lens holder and the screw-threaded cap 10, and a dowel pin 14 on the lens-holder fitted in correspondingly formed notches in the inner edges of said flanges connects the parts for conjunctive rotation.

The cooperative connection between the slide of the eye-piece and the sleeve on the hinge arm upon which it is mounted, is established by a stud 15 on the sleeve which extends freely into a obliquely extending slot 16 of the sliding ring.

It will be apparent that a rotary motion imparted to the thumb shell of the eye piece and communicated to the slide through the intermediary of the dowel pin will cause said slide to move longitudinally upon the stud of the hinge sleeve, the longitudinal movement of the slide being communicated to the lens-holder of the eye piece of which it is a part, to vary the distance between the lenses in the holder of the eye piece and the lenses in the respective objective casing in case a difference in the visual power of the eyes of a person using the binocular demands a secondary adjustment of either eye piece after the conjunctive focal adjustment of the two eye pieces relative to the objective casings has been obtained.

The means for effecting the main focal adjustment of the eye pieces of the binocular consists in the preferred form of the invention illustrated in Figure 2 of the drawings, of the following assemblage of cooperating parts.

The objective casings have for their hinged connection two pairs of arms 17 provided at their adjoining ends with complimentary parts of flush knuckle joints which are in axial alinement with each other and with the correspondingly formed joint of the before-mentioned hinge arms 5 of the eye pieces.

A distance sleeve 18 placed between the pairs of arms of the objective casings to maintain their parallelism, provides a casing for a tubular pintle 19 which extends through alined openings of the knuckles and is held against longitudinal displacement by a head 20 at one end and a headed screw plug 21 at its opposite end.

The plug which is screwed into the pintle carries an integral screw bolt 22 in cooperative engagement with a correspondingly threaded elongate nut 23 which is rotatably fitted inside the hollow pintle.

The nut has in addition to the internal thread which cooperates with the screw bolt on the plug, a second internal thread of opposite direction which engages with a screw 24 extended from the pin 25 by which the hinge arms of the eye pieces are pivotally connected.

The knuckles of the last-mentioned arms which like those of the arms on the casings are formed to provide a flush joint, are held together by a flange 26 on the pin 25 and a cap 27 which is fastened on the pin by a headed screw 28 extending in a threaded opening in the end thereof.

The cap is held against rotation on one of the arms by a dowel pin 29 and it may be graduated as at 30 to cooperate with a fixed mark on the other arm to indicate the pupillary distance between the eye pieces after pivotal adjustment of the casings.

The elongate nut 23 projects beyond the end of the tubular pintle in which it is fitted, for its connection with a knurled thumb wheel 31 intermediate of the arms of the eye pieces and the adjacent pair of arms of the casings.

The focal adjustment of the binocular obtained by moving the eye-pieces longitudinally of the objective casings, is readily accomplished by rotation of the nut 23 through the medium of its thumb wheel, it being apparent that the rotary movement of the nut upon the relatively stationary screw bolt 22 causes it to move longitudinally and at the same time imparts a corresponding axial movement to the screw 24 on the extension of the pivot pin which is held against rotation on the arms by which the eye pieces are connected.

The construction shown in Figure 3 differs from the other in that the nut which cooperates with the screw on the pivot pin of the eye-piece arms, is exteriorly threaded as at 31' to engage with a corresponding interior thread of the pintle.

The external and internal threads of the nut are cut in opposite directions so that when the thumb wheel is rotated, the nut and the pivot pin of the eye-piece arms will both move longitudinally for the focal adjustment of the instrument.

It will be seen that the screw connection between the nut and the pintle of the last-described construction is functionally equivalent to the connection of the nut with the screw bolt of the other and that the only difference between the two forms of the focal adjustment is one of structural design.

It will be observed that the screw 24 and screw bolt 22 are of such length that when the nut 23 is rotated in one direction that the screw 24 will contact with the bolt 22. Thus the movement of the arms 5 towards the adjacent ends of the casings 2 is limited so that should a person continue to rotate the thumb wheel 31 movement of the screw bolt 24 will be arrested by contact with the screw 22. In this manner no strain will be imparted to the arms 5 at their points of connection with the pin 25 and eye-pieces 10, thereby preventing the arms from becoming weakened or worn, which would be very objectionable in articles of this character.

What I claim and desire to secure by Letters-Patent is:

In a binocular telescope, the combination with a pair of casings, eye pieces having arms, said casing having arms, a sleeve engaged between the casing arms, a tubular pintle engaged in the sleeve and passing through the adjacent ends of the casing arms to pivotally connect the same, an elongated nut rotatably mounted in the pintle and having one end projected from the pintle, a thumb wheel fixed to the projected end, a headed screw plug in threaded engagement interiorly with the pintle at one end, said plug having a screw bolt formed integral therewith for threaded engagement in said nut the head of said plug bearing against an adjacent casing arm, a pin pivotally connecting the arms of the eye pieces, a screw carried by the pin for threaded engagement in the nut, said screw and screw bolt having oppositely threaded engagement with said pintle, as and for the purpose set forth.

In testimony whereof I have affixed my signature.

KARL A. EDSTROM.